Sept. 10, 1957     C. M. KRON     2,805,731
DUST FILTER BAG AND FILTERING ASSEMBLY Filed March 21, 1955     2 Sheets-Sheet 1

INVENTOR.
C. M. KRON

ATTORNEYS

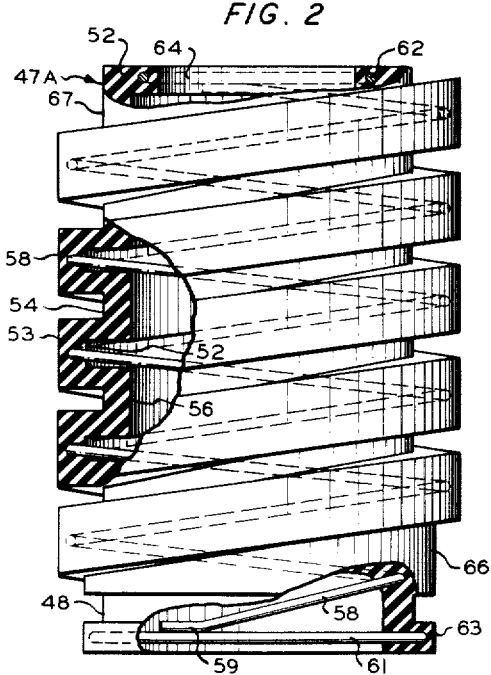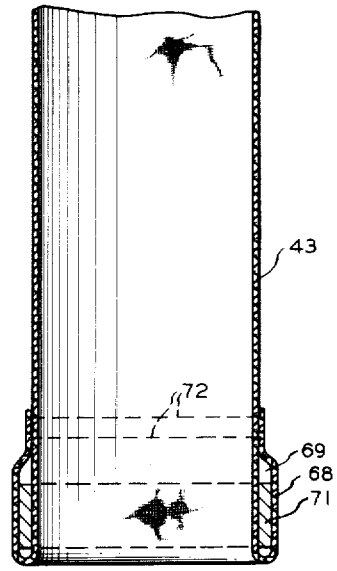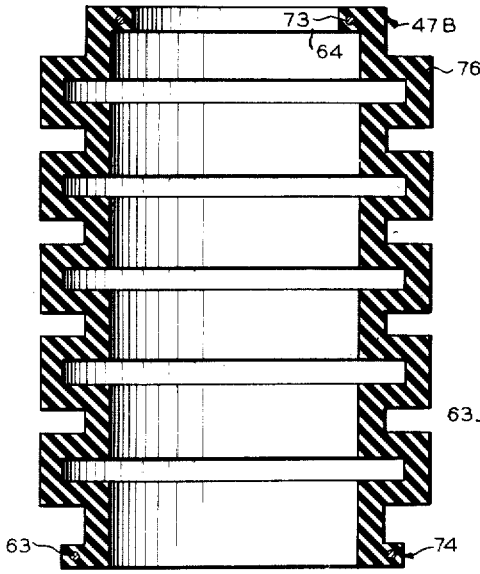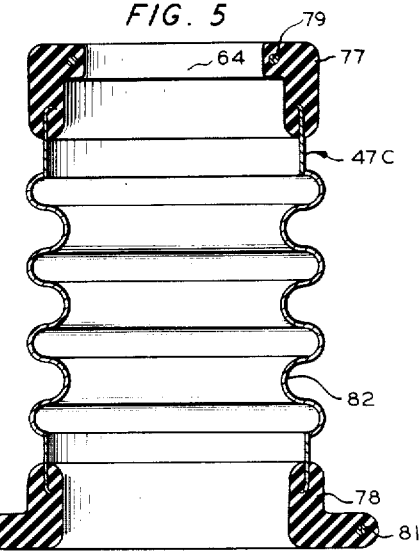

United States Patent Office 2,805,731
Patented Sept. 10, 1957

2,805,731

DUST FILTER BAG AND FILTERING ASSEMBLY

Carl M. Kron, Borger, Tex., assignor to Phillips Petroleum Company, a corporation of Delaware Application March 21, 1955, Serial No. 495,721

4 Claims. (Cl. 183—43)

This invention relates to dust filter bags and dust filtering assemblies comprising one or more of said bags. In one aspect it relates to dust filtering assemblies for filtering solid carbon black particles out of the smoke, or hot effluent gas suspension of said carbon black, coming from a carbon black furnace. In another aspect it relates to a dust filter bag comprising a gas-impermeable dust-arresting fabric bag preferably made of polyacrylonitrile or glass synthetic fiber, connected to a flexible, extensible, gas-impermeable conduit, preferably made of silicone rubber.

In the art of filtering the dust out of a gas suspension of said dust with fabric filter bags, particularly when said gas suspension is the hot effluent smoke from a carbon black furnace cooled to between 250–260° F., considerable shrinkage of the fabric occurs. This shrinkage results in increasing the tension on said bags to such an extent that their active useful life is shortened. Breakage of the bags soon occurs, or they soon become too short to reach from the outlet opening of the carbon black smoke conducting conduit to the bag support which is located a predetermined distance away. Breakage occurs due to increased tension, embrittlement of the fabric in use with age and heat exposure, and generally occurs at the base of the bag during the usual shaking cycle, when the top of the bags are rocked back and forth.

The present invention avoids these difficulties of the prior art by providing a flexible, extensible, gas impermeable conduit adapted to be secured in gas tight communication with said fabric bag and with said outlet opening, whereby any shrinkage of said bag is compensated for by a corresponding extension of said flexible, extensible, first conduit, and the extra stress of tension and bending during the shaking cycle is taken by said flexible conduit, instead of said fabric bag.

One object of the present invention is to provide an improved dust filter bag for filtering dust out of a gas suspension of said dust.

Another object is to provide an improved dust filtering assembly.

Another object is to provide means for compensating for the shrinkage of fabric filter bags during use in a dust filtering assembly, and for embrittlement of said fabric.

A further object is to reduce the bending and tension stresses on said fabric during said shaking cycle.

Numerous other objects and advanges will be apparent to those skilled in the art upon reading the accompanying specification, claims and drawings.

In the drawings:

Figure 2 is an enlarged elevational view of the lower, flexible, extensible, gas-impervious, conduit portion of a filter bag unit of Figure 1 with parts in section or broken away to show details of construction.

Figure 3 is an enlarged elevational sectional view of the lower part of the fabric bag, upper portion, of a filter bag unit of Figure 1.

Figure 4 is an elevational sectional view of a second species of a flexible, extensible, gas-impermeable conduit similar to that shown in Figure 2.

Figure 5 is the elevational sectional view of a third species of a flexible conduit similar to those of Figures 2 and 4, in which the conduit comprises a central section of a transversely corrugated metal bellows secured in gas tight communication, with upper and lower connection means composed of a plastic material.

Figure 1:
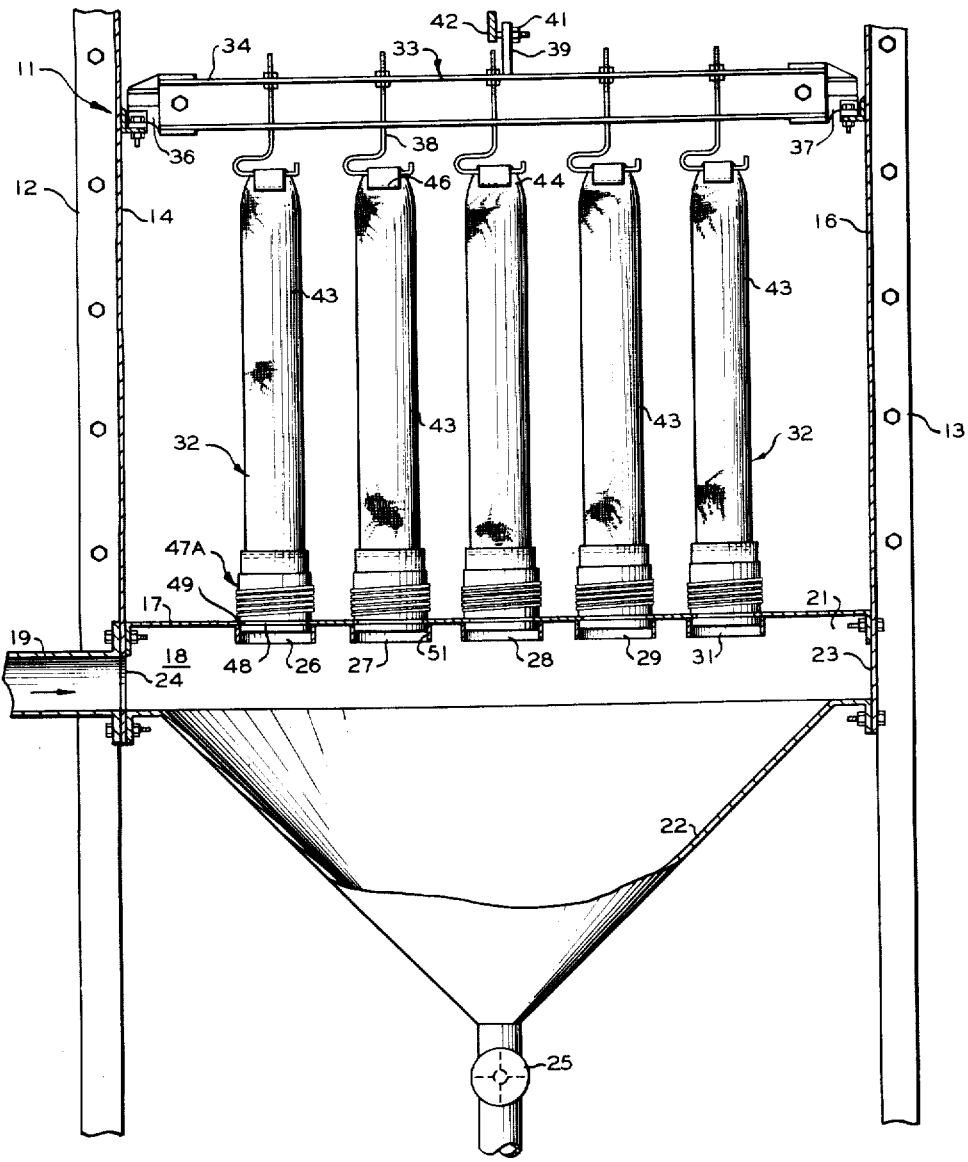
Figure 1 is an elevational view with parts in section, or broken away, to show details of construction, of a dust filtering assembly embodying the present invention.

In Figure 1 is shown a dust filtering assembly generally designated as 11, comprising a housing formed of structural members 12 and 13 and plates 14, 16 and 17. Plate 17 is gas-impermeable and forms the top of a conduit 18 which receives the gas suspension of said dust, such as carbon black smoke coming from a carbon black furnace (not shown) through pipe 19 in the direction indicated by the arrow. Conduit 18 has side walls such as 21, a floor 22, and end wall 23 forming a space which is closed except for an inlet 24 communicating with pipe 19, a lower carbon black star valve outlet 25, and a plurality of outlet openings 26, 27, 28, 29 and 31 each of which is closed by a dust filter bag unit, each bag unit being generally designated as 32. Floor 22 is preferably in the form of a pyramidal bin, to collect and flow the separated carbon black by gravity to conventional star valve 25, which acts as an air-lock, enabling carbon black removal without loss of smoke.

A support, generally designated as 33, is shown in the form of an I beam 34 pivoted at 36 and 37 for rocking movement about the axis of said pivots into and out of the plane of the drawing, is provided with hooks 38, or other conventional means, for supporting the upper ends of filter bag units 32, and the rocking movement may be accomplished by conventional means, such as lever arm 39 rigidly mounted on beam 34, which arm is pivoted at 41 to a shaker bar 42, which may be reciprocated in a direction generally perpendicular to the plane of the drawing by any suitable means (not shown).

The dust filter bag units 32 each comprise in combination a gas-permeable dust-arresting fabric bag 43 having a looped closed end 44, which looped end may be formed by sewing or otherwise securing the end of the tubular bag 43 to its side wall by seam 46, using thread of the same fiber as the bag, and the resulting loop slid over hook 38 to support the filter unit.

The fabric bag 43 is preferably woven out of polyacrylonitrile synthetic fiber, which is available on the open market. One preferred type of this material is known by the registered trademark name "Orlon." Such fabric is fairly heat-resistant, and can be employed for long periods of time at temperatures as high as 280 to about 300° F., although in practice it is preferred to maintain the bags at a lower, controlled temperature, by any conventional means. The temperature of the smoke entering through pipe 19 is controlled by conventional variable water-spray cooling (not shown), so that the temperature of bags 43 will always be between 250–260° F., an alarm (not shown) also being sounded if the temperature ever reaches 275° F.

The fabric of the bags 43 can also be made of glass fiber, and such glass cloth bags shrink less and can operate at temperatures as high as 400° F., but are more brittle than "Orlon" fabric bags. Such glass fiber bags can be used in the present invention, which prevents the tearing of the bags at the base of the bag, where glass fiber bags often tear. The glass fiber can be coated with silicones to reduce tearing.

The dust filter bag units 32 also comprise a lower gas-impervious, flexible, extensible, conduit, generally designated as 47A, several species of which are shown, the species 47A of Figure 1 also being shown in Figure 2, the additional species generally designated as 47B and 47C being shown respectively in Figures 4 and 5.

The flexible conduit 47A in Figure 1 is detachably secured to fabric bag 43 in a manner which will be explained more fully with reference to Figures 2 and 3 below. Conduit 47A is also detachably secured to plate 17 by means of an annular groove 48 which is engaged with an internal annular extension 49 of plate 17 which extends into the interior of pipe 51 of outlets 26 and 31, respectively.

The plastic portions of conduits 47A, 47B and 47C are preferably made of silicone rubber. Silicone rubber is a generic name and also the common name, of a synthetic material the molecules of which are long chains of silicon-oxygen units with two methyl radicals attached to each silicon atom. Silicone rubber is noted for its retention of its elasticity at temperatures as high as 570° F., although there is no reason for it to be heated higher than 260–275° F. in the present invention, and it also stays elastic at temperatures as low as −50° F. and is not affected by ozone, corona, ultraviolet rays, or the combustion gases, carbon black, and other gases, vapors and solids present in carbon black smoke from a carbon black furnace in the present invention. Therefore, it has been found to be especially valuable in the practice of the present invention. Other plastic materials such as polyethylene terephthalate, sheets of which are flexible and stable from −75 to 300° F. with a melting point near 500° F. and a high tensile strength of about 23,500 p. s. i., one brand of which is known by the trademark name of "Mylar," and various heat resistant neoprene vulcanized rubbers, have some value in the practice of this invention as conduits 47A, 47B and 47C, but are not preferred.

In Figure 2 it will be noted that the conduit 47A is formed of a body of flexible, extensible, gas impervious material 52, preferably of said silicone rubber. This body has a certain amount of resilience and can be stretched considerably, but it is preferred to make the same in a corrugated helical form as shown, in order to provide for additional extensibility. In this respect it will be noted that the corrugations are formed of helical exterior threads 53 and exterior grooves 54 alternating as shown with internal helical threads 56 and internal helical grooves 57 as shown. In addition, in many instances it is preferred to also add a helical metal spring 58. The ends 59 of said helical metal spring may be welded, or soldered, or otherwise secured by conventional means, to annular metal rings 61 and 62 at the top and bottom to provide anchorage and additional reinforcement for external flange 63 and internal flange 64 formed in the body 52. Obviously the body 52 may be cast, or molded, over the reinforcing metal elements 58, 61 and 62. The upper and lower ends of helical external thread 53 flatten out into cylindrical surfaces 66 and 67 preferably in a gradual manner at their ends.

The external flange 63 and cylindrical surface 66 form a bottom groove 48, said groove being suitable for engagement with the projecting annular flange 49 of plate 17 shown in Figure 1 as will be explained further below.

In Figure 3 is shown an enlarged cross sectional view of the lower portion of fabric bag 43, the lower end of which is turned back at 68 to form a cuff providing an annular space 69 around a resilient metal sleeve or ring 71, and the turned up cuff may be secured in place by a seam of stitches formed of thread 72 of the same fiber as the bag.

Figure 4 shows a second modification form of flexible conduit 47B which may be provided with reinforcing metal ring 73 and 74 to reinforce the end flanges. It will be noted in this modification that the body 76 is formed with annular transverse corrugations and that there is no reinforcing except for the end rings 73 and 74. If the body and flanges are sufficiently thick the end rings may be dispensed with, but they are preferred in order to save body material.

Figure 5 shows another modification 47C which has plastic ends 77 and 78 which may be provided with metal reinforcing rings 79 and 81 as in the other modifications. While the plastic ends 77 and 78 are preferably made of silicone rubber as in the other modifications, the central portion 82 is preferably a flexible metallic bellows with transverse annular corrugations. Any suitable thin metal may be employed, such as steel, copper, bronze, or the various stainless steel alloys containing nickel and/or chromium, commonly employed as metallic bellows material in the prior art, so long as the bellows formed is flexible and extensible, and preferably resilient.

*Operation*

The filter units 32 of Figure 1 are placed in position by sliding the top closed ends 44 on to hooks 38 by means of the loop formed by the folded ends at 46. The flexible metal ring 71 shown in Figure 3 is deformed by bending by hand enough to allow the insertion of the end 68 into the space below internal flange 64 in Figure 2, or the corresponding parts in Figures 4 and 5, if they are employed. The flange 63 on the bottom of flexible conduit 47A, 47B or 47C of Figures 2, 4, 5 as the case may be, is then deformed and inserted below the shoulder 49 on plate 17 in outlet pipes 26 to 29 and 31, respectively.

The smoke enters through pipe 19 into chamber 18 and passes upwardly through outlets 26 to 29 and 31, respectively, into bags 43. The gas portion of the smoke passes through the fabric of bag 43 into the atmosphere, or through a gas collection hood (not shown) to a point of disposal, while the carbon black solid particles collect on the inside of bags 43. At suitable periods, shaker bar 42 is moved in and out of the plane of the drawing, rocking I beam 34 about the axis of pivots 36 and 37 by means of lever arm 39 and pivot 41. When this is done, the carbon black on the inside of bags 43 is loosened, and falls down into chamber 18 and hopper 22 from which it may be removed periodically by revolving star valve 25 as a powder. The means of removing carbon black from bags 43, space 18 and hopper 22 has not been described further because it is old in the prior art, and it may include employing a plurality of filter sections, each like Figure 1, temporarily closing off one section, and back washing the bags therein with filtered gas during its shaking period, all by conventional means (not shown).

As time goes by, the fabric of bags 43 tends to shrink under the heat of the gases, which as pointed out above ranges from 250 to 650° F. in temperature, or even higher if glass fabric is used, and said fabric also tends to become embrittled. However, in the present invention, as the fabric 43 shrinks the flexible, extensible conduits 47A, 47B and 47C, whichever type are used, stretch to make up for said shrinkage, and thus prevent the tension on fabric 43 from increasing unduly. At the same time the flexing in the units due to the movement of hooks 38 is concentrated in said flexible conduits and does not occur in the embrittled and shrunken fabric bags 43. Because of this, bags 43 have a much longer active useful life. Breakage of the fabric bags, which in the prior art usually occurs adjacent their point of attachment to plate 17, is put off for long periods of time, and may then occur at any point in the bag instead of always adjacent the bottom.

The tendency of bags to tear may be reduced by coating the fiber with silicones, a generic common name for heat-stable organo-silicon oxide polymers made by combining silicon dioxide with methyl or ethyl groups of molecules derived from alcohols, or with ethylene chloride, or with phenol.

While several illustrative embodiments have been shown in the drawings for purposes of describing the invention, the invention obviously is not limited thereto.

Having described my invention, I claim:

1. In a dust filtering apparatus having a body to which a fabric filter tube is secured by securing means at each end of said filter tube, the improvement in which at least one of said securing means connects one end of said tube in open fluid communication with the other side of a plate, forming a portion of said body through a hole in said plate, by means of a flexible plastic shock and tensile stress absorbing conduit, said conduit comprising a central helically corrugated flexible plastic tube section and two end sections integral therewith, one of said end sections secured at one end to said filter tube and the other of said end sections secured at the other end to said plate, annular reinforcing spring wire rings, one buried in said plastic tube in each end section thereof and surrounding one passage therethrough, and a helical spring wire buried in said plastic tube and following the helical corrugations thereof, each end of said helical spring wire being secured to the respective adjacent spring wire ring.

2. The combination of claim 1 in which the plastic conduit is silicone rubber in order to resist superatmospheric heat.

3. The combination of claim 1 in which the plastic conduit is polyethylene terephthalate in order to resist superatmospheric heat.

4. The combination of claim 1 in which the plastic conduit is heat resistant neoprene vulcanized rubber in order to resist superatmospheric heat.

References Cited in the file of this patent

UNITED STATES PATENTS

| | | |
|---|---|---|
| 713,559 | Dodge | Nov. 11, 1902 |
| 1,813,896 | Paine | July 7, 1931 |
| 2,167,236 | Gieseler | July 25, 1939 |
| 2,576,310 | Ruemlin | Nov. 27, 1951 |
| 2,719,599 | Cropley | Oct. 4, 1955 |

FOREIGN PATENTS

| | | |
|---|---|---|
| 813,088 | France | Feb. 15, 1937 |
| 1,040,053 | France | May 20, 1953 |

UNITED STATES PATENT OFFICE
CERTIFICATE OF CORRECTION

Patent No. 2,805,731 September 10, 1957

Carl M. Kron

It is hereby certified that error appears in the printed specification of the above numbered patent requiring correction and the said Letters Patent should read as corrected below.

Column 5, line 19, for "surrounding one" read -- surrounding the --.

Signed and sealed this 19th day of November 1957.

(SEAL)
Attest:

KARL H. AXLINE
Attesting Officer

ROBERT C. WATSON
Commissioner of Patents